United States Patent Office 2,857,424
Patented Oct. 21, 1958

2,857,424

PREPARATION OF OXALIC ACID SALTS OF PHENYLENE DIAMINES

William L. Cox, Brookfield, Ill., assignor to Universal Oil Products Company, Des Plaines, Ill., a corporation of Delaware No Drawing. Application August 25, 1955
Serial No. 530,627

9 Claims. (Cl. 260—501)

This invention relates to an improved method of preparing oxalic acid salts of phenylene diamines.

Phenylene diamines, and particularly N,N'-dialkyl-p-phenylene diamines, are especially useful as additives to prevent oxidative deterioration of certain organic substances. For example, N,N'-di-sec-butyl-p-phenylene diamine is a very effective additive to retard oxidative deterioration of gasoline. However, this compound is toxic and, therefore, presents a hazard when used in substrates which are handled by the workers. In such cases, it is preferred to use a less toxic additive as, for example, an oxalic acid salt of this compound.

It recently has been found that N,N'-dialkyl-p-phenylene diamines in which each alkyl group contains at least 8 carbon atoms are effective additives to prevent cracking of rubber due to ozone. The rubber companies are accustomed to handling solid materials and, therefore, may prefer to use a solid additive. The oxalic acid salts of these phenylene diamines are solid and thus may be preferred by some users.

In one embodiment the present invention relates to an improved method of preparing an oxalic acid salt of a phenylene diamine which comprises reacting said phenylene diamine with oxalic acid in the presence of a ketone solvent.

It has been found that the use of a ketone solvent in the preparation of the oxalic acid salts of phenylene diamines results in considerably improved yields and a considerably faster rate of reaction. For example, it is reported that the reaction of oxalic acid and N,N'-di-sec-butyl-p-phenylene diamine in the presence of ethanol solvent was maintained at reaction conditions for 30 minutes and that the yield was 82% of theoretical. Similarly, the use of methanol as a solvent in this reaction required over 10 minutes of reaction time and the yield was only 60% of the theoretical. In contrast, it now has been found that effecting this reaction in the presence of acetone as a solvent results in instantaneous reaction and yields of 96% or over of the theoretical.

From the above examples, it will be noted that considerably greater yields and a considerably faster rate of reaction are obtained in accordance with the improved process of the present invention using acetone as a solvent. These improved yields and faster rate of reaction are important from a manufacturing viewpoint and result in a considerably more economical method of manufacturing these products.

The present invention is particularly applicable to the preparation of the oxalic acid salts of N,N'-dialkyl-p-phenylene diamines which are useful as additives to organic substances to retard deterioration thereof. These N,N'-dialkyl-p-phenylene diamines include N,N'-diisopropyl-p-phenylene diamine, N,N'-di-sec-butyl-p-phenylene diamine, N,N'-di-sec-amyl-p-phenylene diamine, N,N'-di-sec-hexyl-p-phenylene diamine, N,N' - di - sec-heptyl-p-phenylene diamine, N,N'-di-sec-octyl-p-phenylene diamine, N,N'-di-sec-nonyl-p-phenylene diamine, N,N'-di-sec-decyl-p-phenylene diamine, N,N'-di-sec-undecyl-p-phenylene diamine, N,N'-di-sec-dodecyl-p-phenylene diamine, N,N'-di-sec-tridecyl-p-phenylene diamine, etc.

While the preparation of the oxalic acid salts of the specific N,N'-dialkyl-p-phenylene diamines set forth above is preferred, it is understood that the improved method of the present invention may be utilized for the preparation of other phenylene diamines including phenylene diamine, N,N'-dimethyl-p-phenylene diamine, N,N'-diethyl-p-phenylene diamine, other N,N'-dialkyl-p-phenylene diamines in which the alkyl substituent is other than secondary and each substituent contains from 3 to 13 carbon atoms, N,N'-dialkyl-p-phenylene diamines in which each alkyl group contains from 14 to 20 or more carbon atoms, N-alkyl-p-phenylene diamines in which the alkyl substituent contains from 1 to 20 or more carbon atoms, N-cycloalkyl-p-phenylene diamines and N,N'-dicycloalkyl-p-phenylene diamines as well as the corresponding ortho- and meta-phenylene diamines. When desired, oxalic acid salts of mixtures of the phenylene diamines may be prepared. It is understood that the preparation of these various phenylene diamines will not necessarily result in equal yields and equal rates of reaction.

As hereinbefore set forth, improved results in the preparation of the salts are obtained when using a ketone solvent. Any suitable ketone may be employed. Acetone is particularly preferred. Other ketones include methyl ethyl ketone, methyl propyl ketone, methyl butyl ketone, ethyl propyl ketone, ethyl butyl ketone, propyl butyl ketone, dibutyl ketone, etc. The use of the anhydrous ketone generally is preferred, although in some cases an aqueous solution containing up to 10–15% by volume of water may be employed.

The preparation of the oxalic acid salt is effected in any suitable manner. In a preferred method, oxalic acid is dissolved in the ketone and the resultant solution is mixed with the phenylene diamine. In another preferred embodiment, the phenylene diamine also is dissolved in the same or different ketone prior to commingling the ketone solution of oxalic acid therewith. As hereinbefore set forth, in the reaction medium comprising the ketone, precipitation of the solution is considerably hastened and, in many cases, commences before all of the acid solution is added. In most cases, the acid solution is commingled with the phenylene diamine within a period of 5 minutes and an even shorter time when desired. As hereinbefore set forth, many preparations are instantaneous although, in some cases, particularly in the preparation of the dioxalate, a period up to 15 minutes may be required to complete the reaction. The reaction generally is effected at ambient temperature, although, in some cases, warming of the mixture is desirable.

In a preferred embodiment, the mono-oxalic acid salt of the phenylene diamine is prepared. In another embodiment, the dioxalic acid salt is prepared. When preparing the mono-oxalic acid salt, the oxalic acid and phenylene diamine are used in equal mol proportions. When preparing the dioxalic acid salt, at least 2 mol proportions of oxalic acid are used per mol proportion of phenylene diamine and generally it is unnecessary to utilize more than about 4 mol proportions of oxalic acid.

The following examples are introduced to illustrate further the novelty and utility of the present invention but not with the intention of unduly limiting the same.

*Example I*

The mono-oxalic acid salt of N,N'-di-sec-butyl-p-phenylene diamine was prepared as follows: A solution of 25 g. (0.2 mol) of oxalic acid dihydrate in 150 g. of acetone was prepared. This solution was added at room temperature to a solution of 44 g. (0.2 mol) of N,N'-di-sec-butyl-p-phenylene diamine in 54 g. of acetone. Precipitation occurred before half of the acid solution was added. The acid was added over a period of 2.5 minutes and the mixture then was filtered and the precipitate was washed with acetone and then dried. The final product was a white powder and weighed 60.5 g., which is equivalent to a yield of 97.6% of the theoretical. The crystals had a melting point of 169-170° C. The product was analyzed as 8.79% nitrogen. The calculated value is 9.03% nitrogen.

The high yield and rapid rate of reaction utilizing acetone is compared to a reported preparation using 95% ethanol as the solvent, which preparation was kept warm for 30 minutes. The yield in this preparation was 82% of theoretical.

It will be noted that a considerably better yield and faster rate of reaction were obtained when using acetone as the solvent.

*Example II*

The dioxalate of N,N'-di-sec-butyl-p-phenylene diamine was prepared in substantially the same manner as described in Example I, except that two mols of oxalic acid were used per mol of N,N'-di-sec-butyl-p-phenylene diamine. A yield of 95% of the dioxalate was obtained, having a melting point of 204-208° C. Here again the reaction was instantaneous.

*Example III*

The mono-oxalic acid salt of N,N'-di(1-ethyl-3-methylpentyl)-p-phenylene diamine was prepared in substantially the same manner as described in Example I. A yield of about 90% of the salt was obtained, having a melting point of 132-135° C. This product was analyzed and found to contain 6.63-6.67% nitrogen, as compared to the calculated value of nitrogen of 6.64%. Precipitation was completed within three minutes.

*Example IV*

The mono-oxalate of N-(1-ethyl-3-methylpentyl)-p-phenylene diamine was prepared in substantially the same manner as described in Example I. A yield of 95% of the desired product, having a melting point of 158-9° C. was obtained. The product had a nitrogen content of 8.94-9.10%, as compared to the calculated value of 9.03. Here again the reaction was instantaneous.

*Example V*

The mono-oxalate of N,N'-di-cyclohexyl-p-phenylene diamine was prepared in substantially the same manner as described in Example I. A yield of 95% of the desired product, having a melting point of 168-9° C. was obtained. As before, the reaction was instantaneous.

*Example VI*

The dioxalate of N,N'-di(1-methylheptyl)-p-phenylene diamine was prepared in substantially the same manner as described in Example I. A 98% yield of the desired product, having a melting point of 185-6° C., was obtained. The reaction was instantaneous. In this preparation, the oxalic acid was utilized in a mol proportion of 4:1 to the phenylene diamine compound.

*Example VII*

The mono-oxalic acid salt of N,N'-didecyl-p-phenylene diamine was prepared in substantially the same manner as described in Example I. A yield of over 95% of the salt was obtained, having a melting point of 122° C. The reaction was instantaneous.

I claim as my invention:

1. In the reaction of a phenylene diamine with oxalic acid, the improvement which comprises effecting the reaction in the presence of a di-alkyl ketone having from 1 to about 4 carbon atoms in each of the alkyl groups.

2. In the reaction of a phenylene diamine with oxalic acid, the improvement which comprises effecting the reaction in the presence of acetone.

3. In the reaction of a phenylene diamine with oxalic acid, the improvement which comprises dissolving at least one of said reactants in acetone prior to the reaction.

4. In the reaction of a phenylene diamine with oxalic acid, the improvement which comprises dissolving both of said reactants in acetone prior to the reaction.

5. In the reaction of an N,N'-di-alkyl-p-phenylene diamine with oxalic acid, the improvement which comprises effecting the reaction in the presence of a di-alkyl ketone having from 1 to about 4 carbon atoms in each of the alkyl groups.

6. In the reaction of an N,N'-d-cycloalkyl-p-phenylene diamine with oxalic acid, the improvement which comprises effecting the reaction in the presence of a di-alkyl ketone having from 1 to about 4 carbon atoms in each of the alkyl groups.

7. In the reaction of N,N'-di-sec-butyl-p-phenylene diamine with oxalic acid, the improvement which comprises effecting the reaction in the presence of acetone.

8. In the reaction of N,N'-di-sec-octyl-p-phenylene diamine with oxalic acid, the improvement which comprises effecting the reaction in the presence of acetone.

9. In the reaction of N,N'-di-cyclohexyl-p-phenylene diamine with oxalic acid, the improvement which comprises effecting the reaction in the presence of acetone.

References Cited in the file of this patent

UNITED STATES PATENTS

| | | |
|---|---|---|
| 1,875,903 | Williams et al. | Sept. 6, 1932 |
| 2,130,947 | Carothers | Sept. 20, 1938 |
| 2,130,948 | Carothers | Sept. 20, 1938 |
| 2,279,385 | Brimer | Apr. 14, 1942 |
| 2,632,770 | Hunter | Mar. 24, 1953 |

FOREIGN PATENTS

| | | |
|---|---|---|
| 632,997 | Great Britain | Dec. 5, 1949 |

OTHER REFERENCES

Feigl et al.: Monatshefte Chem. 59 (1932), pp. 136-9, 150-51.